(12) United States Patent
Yokonuma

(10) Patent No.: US 6,292,630 B1
(45) Date of Patent: Sep. 18, 2001

(54) CAMERA

(75) Inventor: Norikazu Yokonuma, Adachi-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/499,635

(22) Filed: Feb. 8, 2000

(30) Foreign Application Priority Data

Feb. 9, 1999 (JP) .................................. 11-031755

(51) Int. Cl.$^7$ .................................. G03B 15/03
(52) U.S. Cl. .................................. 396/169
(58) Field of Search .................................. 396/169, 165, 396/166, 168

(56) References Cited

U.S. PATENT DOCUMENTS 5,305,050 * 4/1994 Saegusa et al. ...................... 396/169

* cited by examiner

*Primary Examiner*—W. B. Perkey
(74) *Attorney, Agent, or Firm*—Oliff & Berridge, PLC

(57) ABSTRACT

A camera includes: a photographing control device that (1) performs flash photographing accompanied by light emission by an electronic flash unit with a shutter speed fixed when results of field brightness measurement performed by a photometering device which measures field brightness indicate a value equal to or lower than a predetermined first reference brightness, (2) performs flash photographing at a first shutter speed when the results of the field brightness measurement indicate a value equal to or lower than the first reference brightness and higher than a second reference brightness which is lower than the first reference brightness and (3) performs flash photographing at a second shutter speed higher than the first shutter speed when the results of the field brightness measurement indicate a value equal to or lower than the second reference brightness.

9 Claims, 3 Drawing Sheets

CAMERA

INCORPORATION BY REFERENCE

The disclosure of the following priority application is herein incorporated by reference: Japanese Patent Application No. 11-31755 filed Feb. 9, 1999.

BACKGROUND OF THE INVENTION

1. Field of the Invention

The present invention relates to a camera, and more specifically it relates to a camera capable of minimizing blurring during a flash photographing operation accompanied by light emission by an electronic flash unit.

2. Description of the Related Art

In a camera that automatically switches to flash photographing if the field brightness is lower than a predetermined brightness level (hereafter in this specification referred to as a "low-brightness auto-flash camera"), the shutter speed in the range of one tenth to one hundredth of a second is normally set for flash photographing. The length of flash time by the electronic flash unit in such a camera is several milliseconds at the most, and the upper limit of the synchronization speed at which the light emission by the electronic flash unit can be made to synchronize with the shutter open/close operation is in the range of one hundredth to one thousandth of a second.

One of the objectives to be achieved by setting the shutter speed for flash photographing lower than the synchronization speed, i.e., at one tenth to one hundredth of a second is an improvement in the depiction of the background. In a hypothetical situation in which a person is photographed against a background of sunset colors after the sunset, a correct exposure can be achieved with respect to the person based upon the aperture set at the camera and the flash amount of the electronic flash unit normally regardless of a shutter speed.

The exposure of the background, on the other hand, which is beyond the range of the flash light, depends upon the aperture and shutter speed set at the camera and the brightness of the background. If the shutter speed is set at the synchronization speed explained earlier, a sufficient exposure quantity may not be achieved depending upon the background brightness and in that case, the background in the finished photograph will be underexposed and become dark and the intended depiction results will not be obtained. This is not a problem that occurs only when the sunset color is used as the background but is a common problem which may occur any time the distance between the main subject and the background is so great that the light from the electronic flash unit cannot reach the background and the brightness of the background is relatively low.

In addition, since the illuminating light is irradiated on the subject almost directly from the front in a flash photographing operation performed with a camera internally or externally mounted with an electronic flash unit, if the subject is a person, the subject's face may look devoid of shade and depth, which will result in an unnatural look.

In order to address the problems explained above, the shutter speed for flash photographing is often set relatively low in a low-brightness auto-flash camera. In other words, by performing a photographing operation using ambient light and not emitting light from the electronic flash unit unless the field brightness reaches a predetermined lower limit at which the required shutter speed is too low and would result in noticeable hand-movement blurring (caused by camera vibration by hand tremble), photographing results that reflect the ambience of the location can be obtained. The ambient light means light in case that the electronic flash unit is not used.

Then, flash photographing is performed when the field brightness becomes lower than the brightness limit at which hand-movement blurring becomes a problem as described above. The flash photographing operation is performed by fixing the shutter speed at a specific value, i.e., at the shutter speed with flash operation, even when the field brightness becomes low. By lowering the brightness level at which the camera is switched from ambient light photographing to flash photographing as much as possible and lowering the shutter speed with flash operation, flash photographing results with superior background depiction can be obtained with greater ease.

However, if the brightness level at which the camera is switched from ambient light photographing to flash photographing is set low and the shutter speed for flash photographing is also set relatively low as described above, a problem arises of the background becoming blurred easily as explained below.

While the shutter speed for flash photographing is set by ensuring that hand-movement blurring is minimized, it needs to be set relatively low in order to achieve an improvement in the background depiction. In addition, the shutter speed at which hand-movement blurring becomes noticeable varies depending upon individual photographer's skills, the way the camera is held, the manner in which the shutter release button is pressed and the like.

Thus, while the main subject can be photographed with clarity by taking advantage of the stop-action effect achieved by a very short flash duration at the electronic flash unit, the background sometimes becomes blurred and unacceptable. In particular, the quality of an image photographed with objects having a relatively high brightness level such as street lamps or neon signs as points of light in the background, for instance, may become even worse due to leaving tails of the street lamps or neon signs.

SUMMARY OF THE INVENTION

An object of the present invention is to provide a camera achieving superior background depiction in pictures taken through flash photographing and capable of minimizing the degree to which the photographic depiction is lowered due to hand-movement blurring.

In order to attain the above object, a camera according to the present invention comprises: a photographing control device that (1) performs flash photographing accompanied by light emission by an electronic flash unit with a shutter speed fixed when results of field brightness measurement performed by a photometering device which measures field brightness indicate a value equal to or lower than a predetermined first reference brightness, (2) performs flash photographing at a first shutter speed when the results of the field brightness measurement indicate a value equal to or lower than the first reference brightness and higher than a second reference brightness which is lower than the first reference brightness and (3) performs flash photographing at a second shutter speed higher than the first shutter speed when the results of the field brightness measurement indicate a value equal to or lower than the second reference brightness.

In this camera, it is preferred that: the first reference brightness corresponds to a field brightness at which a correct image surface exposure quantity is achieved at the first shutter speed without light emission by the electronic flash unit; and the second reference brightness corresponds to a brightness close to a lower limit of a field brightness range over which a background located far beyond a main subject over a distance such that flash light emitted from the electronic flash unit does not substantially reach can be depicted in an image obtained through a photographing operation performed at the first shutter speed.

It is also preferred that the first shutter speed is roughly equal to a hand-held photographing limit shutter speed that is determined in correspondence to a focal length of a taking lens mounted or internally provided at a camera main body.

It is also preferred that the second shutter speed which is higher than approximately twice the first shutter speed.

Another camera according to the present invention comprises: a photographing control device that (1) performs ambient light photographing by using a combination of a shutter speed and an aperture value corresponding to results of field brightness measurement performed by a photometering device which measures field brightness when the results of the field brightness measurement indicate a value higher than a predetermined first reference brightness, (2) performs flash photographing accompanied by light emission by an electronic flash unit with a shutter speed fixed when the results of the field brightness measurement indicate a value equal to or lower than the first reference brightness, (3) performs flash photographing at a first shutter speed when the results of the field brightness measurement indicate a value equal to or lower than the first reference brightness and higher than a second reference brightness which is lower than the first reference brightness and (4) performs flash photographing at a second shutter speed higher than the first shutter speed when the results of the field brightness measurement indicate a value equal to or lower than the second reference brightness.

An electronic camera according to the present invention comprises: an image-capturing element that performs photoelectric conversion on a subject image formed by a photographic optical system; and a photographing control device that (1) performs flash photographing accompanied by light emission by an electronic flash unit with a length of photoelectric conversion time at the image-capturing element fixed when results of field brightness measurement performed by a photometering device which measures field brightness indicate a value equal to or lower than a predetermined first reference brightness, (2) performs flash photographing with a first length of photoelectric conversion time when the results of the field brightness measurement indicate a value equal to or lower than the first reference brightness and higher than a second reference brightness which is lower than the first reference brightness and (3) performs flash photographing with a second length of photoelectric conversion time shorter than the first length of photoelectric conversion time when the results of the field brightness measurement indicate a value equal to or lower than the second reference brightness.

In this electronic camera, it is preferred that: the first reference brightness corresponds to a field brightness at which a correct image surface exposure quantity is achieved with the first length of photoelectric conversion time without light emission by the electronic flash unit; and the second reference brightness corresponds to a brightness close to a lower limit of a field brightness range over which a background located far beyond a main subject over a distance such that flash light emitted from the electronic flash unit does not substantially reach can be depicted in an image obtained through a photographing operation performed with the first length of photoelectric conversion time.

It is also preferred that the first length of photoelectric conversion time is roughly equal to a hand-held photographing limit photoelectric conversion time that is determined in correspondence to a focal length of a taking lens mounted or internally provided at a camera main body.

It is also preferred that the second length of photoelectric conversion time is shorter than approximately ½ of the first length of photoelectric conversion time.

DESCRIPTION OF THE PREFERRED EMBODIMENTS

Figure 1:
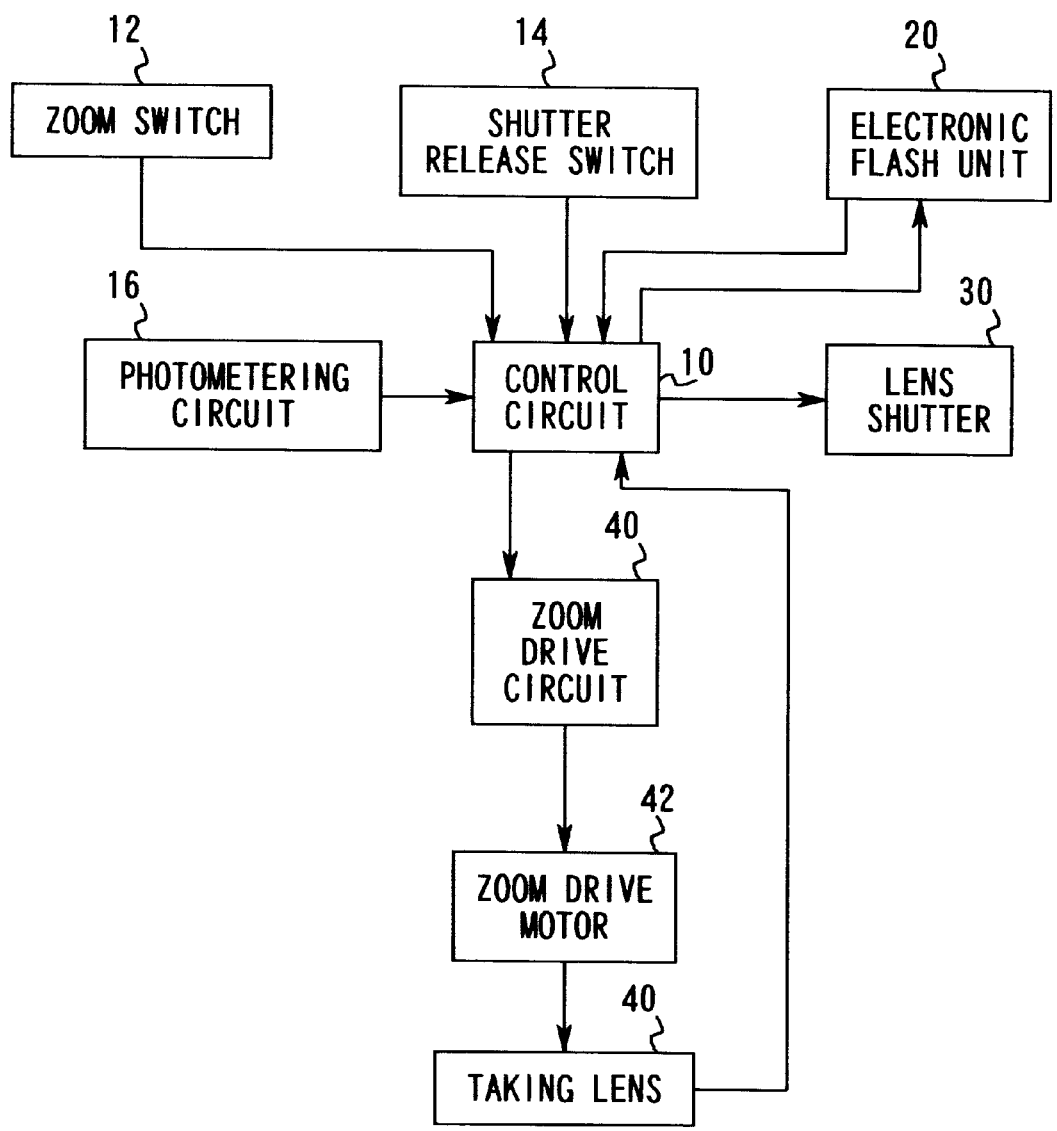
FIG. 1 is a schematic diagram illustrating the internal structure of the camera in an embodiment of the present invention.

In FIG. 1, which illustrates a schematic internal structure of the camera in an embodiment of the present invention, a zoom switch 12, a shutter release switch 14, an electronic flash unit 20, a photometering circuit 16, a lens shutter 30, a zoom drive circuit 40 and the like are connected to a control circuit 10 that implements overall control of camera operations. A zoom drive motor 42, which is a drive source for enabling a taking lens 44 to engage in variable magnification power operation, is connected to the zoom drive circuit 40. The taking lens 44 is internally provided with a zoom encoder (not shown) that generates a signal corresponding to the focal length, and the signal from the zoom encoder is input to the control circuit 10. Hereafter in this specification, the signal output by the zoom encoder which corresponds to the focal length of the taking lens 44 is to be referred to simply as a "focal length signal."

The control circuit 10 transmits a control signal to the zoom drive circuit 40 upon detecting an operation of the zoom switch 12 by the photographer. In response to the control signal generated by the control circuit 10, the zoom drive circuit 40 drives the zoom drive motor 42 to engage the taking lens 44 in a variable magnification power operation. At this time, the control circuit 10 receives the focal length signal from the zoom encoder (not shown) provided in the taking lens 44.

The control circuit 10 outputs a command to the electronic flash unit 40 to either charge the main capacitor (not shown) for a flash or to emit light. In addition, the control circuit 10 receives the charge status at the main capacitor output by the electronic flash unit 20, and when it decides that the charge at the main capacitor has been completed, it accepts an operation of the shutter release switch 14 by the photographer.

Upon detecting that the photographer has operated the shutter release switch 14, the control circuit 10 receives field brightness information from the photometering circuit 16. Then, it determines a correct exposure value, i.e., a correct combination of the aperture value at the taking lens 44 and the shutter speed based upon the field rightness information input from the photometering circuit 16, the film sensitivity that is input in advance and a signal indicating the focal length of the taking lens 44. The control circuit 10 executes an exposure operation by controlling the lens shutter 30 based upon the exposure value determined as described above At this time, the control circuit 10 executes the exposure operation in a flash photographing mode, which is to be detailed later, if the exposure value is smaller than a preset value, i.e., if the shutter speed is low.

Figure 2:
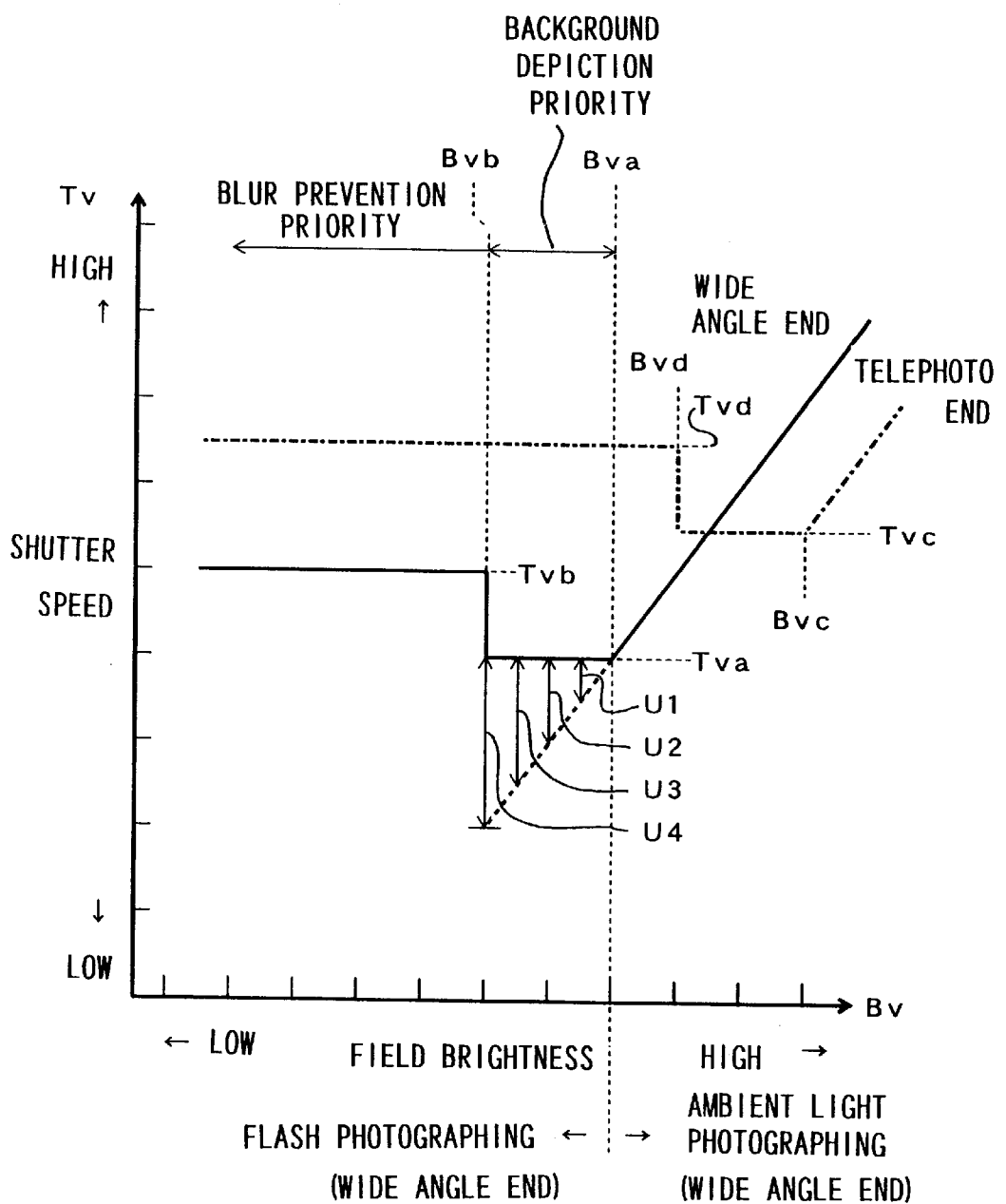
FIG. 2 illustrates how the shutter speed setting may be varied in correspondence to the field brightness.

Details of the exposure operation controlled by the control circuit 10 are now explained in reference to FIGS. 1 and 2. It is to be noted that the following explanation is based upon a prerequisite that the main subject is positioned within the reach of light emitted by the electronic flash unit with the background and the main subject away from each other over a considerable distance, i.e., with the background set at a long distance over which the flash light cannot substantially reach. In addition, it is assumed that the maximum aperture F number of the taking lens 44 changes in correspondence to the focal length position, with the maximum aperture F number on the wide angle side smaller (brighter) than the maximum aperture F number on the telephoto side.

FIG. 2 illustrates changes in the shutter speed at the lens shutter 30, which is set by the control circuit 10 in correspondence to changes in the field brightness, with the horizontal axis representing the field brightness and the vertical axis representing the shutter speed. A high shutter speed means a short period of time for opening the shutter and a low shutter speed means a long period of time for opening the shutter. The graph with the solid line in FIG. 2 represents changes in the shutter speed relative to changes in the field brightness when the taking lens 44 is positioned at the wide angle end. In addition, the graph with the one-dot chain line in FIG. 2 represents changes in the shutter speed relative to changes in the field brightness when the taking lens 44 is positioned at the telephoto end.

The graph with the solid line in FIG. 2 is now explained, starting on the high brightness side. The shutter speed setting becomes lower in correspondence to the reduction in the field brightness in the range over which the brightness is sufficiently high, i.e., in the ambient light photographing range over which the field brightness exceeds a predetermined brightness Bva in FIG. 2. If a photographing operation is performed with the taking lens positioned at the wide angle end with the field brightness exceeding Bva, in which case the shutter speed is at a setting at which hand-movement blurring is not readily noticeable, the control circuit 10 does not cause the electronic flash unit 20 to emit light.

The shutter speed is fixed at Tva in the brightness range over which the field brightness is equal to or lower than Bva and also exceeds Bvb. The control circuit 10 causes the electronic flash unit 20 to emit light in this brightness range. The shutter speed Tva is set as low as possible within the speed range over which hand-movement blurring is not readily noticeable with the taking lens 44 positioned at the wide angle end. The shutter speed Tva is normally set at the shutter speed that is normally referred to as the hand-held photographing limit shutter speed. This hand-held photographing limit shutter speed is equivalent to 1/focal length of a taking lens either interchangeably mounted or internally provided at a camera that uses, for instance, the 135 type 35 mm film. In other words, if the focal length of the taking lens is 30 mm, the hand-held photographing limit shutter speed is approximately 1/30 seconds.

In any camera with a different image plane size, it is desirable to set the shutter speed Tva as low as possible, at which hand-movement blurring is not readily noticeable, in correspondence to the image plane size and the focal length of the taking lens. In other words, it is desirable to increase the shutter speed Tva as the focal length of the taking lens increases and to increase the shutter speed Tva as the image plane size becomes reduced if the focal length remains the same. The shutter speed Tva in this context is the shutter speed at which a correct image surface exposure quantity can be achieved for a subject having the brightness Bva.

When a photographing operation is performed under the conditions described above, a nearly constant image surface exposure quantity can be achieved for the main subject which is irradiated by the electronic flash unit 20, regardless of the field brightness. However, since the light from the electronic flash unit 20 does not reach the background as explained earlier, and the shutter speed is fixed at Tva regardless of the field brightness, the image surface exposure quantity for the background becomes reduced as the field brightness becomes lower. Arrows U1, U2, U3 and U4 in FIG. 2 show how the degree of insufficiency of the image surface exposure quantity for the background increases under such circumstances.

When the degree of insufficiency of the image surface exposure quantity is not very large and is within the range of the film latitude (effective exposure range), the ambience of the photographic scene can be reproduced in a satisfactory manner even though the background of the image obtained through photographing is somewhat dark. In this embodiment, as long as the degree of insufficiency of the image surface exposure quantity for the background is smaller than U4, the ambience of the background scene can be reproduced in a satisfactory manner. Namely, while there is a possibility of hand-movement blurring being noticeable in an image obtained through photographing performed at the shutter speed Tva depending upon the manner in which the photographing operation is performed, the degree of insufficiency of the image surface exposure quantity for the background is not very large and, thus, the ambience of the photographic scene can be reproduced in a satisfactory manner. In the embodiment, the brightness range over which the brightness is equal to or lower than Bva and exceeds Bvb with the taking lens 44 positioned at the wide angle end is referred to as the background-priority range. In addition, Bvb is set at a brightness level that is approximately ¼ Bva in the embodiment. Generally speaking, the latitude of reversal film is approximately ±2.5 EV in EV conversion and the latitude of the negative film is approximately ±5 EV in EV conversion.

In addition, as is to be detailed later, when the present invention is adopted in an electronic still camera or the like, the dynamic range of image data is approximately ±4EV. However, since a subject having a brightness level very close to a limit of the latitude or the dynamic range is reproduced in either black or white on the image, good background depiction can be achieved by setting Bvb at approximately ¼ Bva as explained above. Consequently, in the background priority range, although there is a risk of the quality of the image being lowered due to hand-movement blurring, this disadvantage is more than compensated for by the advantage of superior reproduction of the ambience of the photographic scene.

Bvb which is the lower limit brightness level of the background depiction priority range may be varied in correspondence to the type of film in use. Namely, Bvb may be lowered when negative film with a relatively wide latitude is used, whereas Bvb may be set higher when reversal film with a relatively narrow latitude is used. In particular, by providing an electrical contact point in the Patrone (magazine) chamber of the camera and making it possible to read information regarding the latitude of the film from the Patrone, Bvb may be automatically set by the control circuit 10 in correspondence to the latitude of the film that is currently loaded. In addition, the photographer may select, via a separate switch, whether the background depiction is to be given priority or blur prevention is to be given priority, so that the control circuit 10 sets Bva and Bvb as appropriate in correspondence to the selection made by the photographer.

In the brightness range over which the field brightness is equal to or lower than Bvb, the shutter speed is set to the shutter speed Tvb, which is higher than the shutter speed Tva in the background detection priority range. In more specific terms, the shutter speed Tvb is set, at least, approximately twice as high as the shutter speed Tva in the background depiction priority range. The control circuit 10 causes the electronic flash unit 20 to emit light in this brightness range as well. The shutter speed is set higher since, if the degree of insufficiency of the image surface exposure quantity for the background exceeds a specific value (U4 in the embodiment), the background of the image obtained through photographing is rather dark and, therefore, cannot be identified as the background image. In other words, an image in which the main subject, illuminated by the electronic flash unit, appears to be floating in the dark, is obtained, thereby detracting from the advantage which would be achieved in the composition by setting the shutter speed at Tva.

In addition, if a bright spot such as a lamp is present in the background, the image of the bright spot may be caused to leave a trail by hand-movement blurring, resulting in poor image quality. For this reason, the control circuit 10 increases the shutter speed when the field brightness is lowered to be equal to or lower than the brightness Bvb at which it is determined that desired background depiction can no longer be obtained by performing flash photographing at the shutter speed Tva.

As explained above, when the field brightness has become lowered to a level at which good background depiction cannot be achieved in an image obtained through flash photographing, the likelihood that the image of the bright spot leaves a trail can be reduced by increasing the shutter speed for flash photographing to obtain more desirable photographing results. In the explanation of the embodiment, the brightness range equal to or lower than Bvb when the taking lens 44 is positioned at the wide angle end is referred to as a blur-prevention priority range.

While an explanation is given above on an example in which the taking lens 44 is positioned at the wide angle end, now an example in which the taking lens 44 is set at the telephoto end is explained in reference to FIGS. 1 and 2.

Changes in the shutter speed of the lens shutter 30 set by the control circuit 10 in correspondence to changes in the field brightness are now explained by referring to the graph in the one-dot chain line in FIG. 2, which represents changes occurring when the taking lens 44 is positioned at the telephoto end, starting from the high brightness side. In the brightness range exceeding the brightness level Bvc, ambient light photographing is performed and the shutter speed setting becomes lowered in correspondence to the reduction in the field brightness. Since the shutter speed is such that hand-movement blurring is not readily noticeable in this brightness range, the control circuit 10 does not cause the electronic flash unit 20 to emit light.

In the brightness range with the field brightness equal to or lower than Bvc and exceeding Bvd, the shutter speed is fixed at Tvc. The shutter speed Tvc is set at the lowest possible value in the speed range over which hand-movement blurring is not readily noticeable when the taking lens 44 is set at the telephoto end, i.e., at the hand-held photographing limit shutter speed at the telephoto end. At the shutter speed Tvc, a correct image surface exposure quantity can be achieved for a subject with the brightness Bvc.

Generally speaking, hand-movement blurring becomes more noticeable as the focal length of the taking lens increases. In addition, as explained earlier, at the taking lens 44 in the camera in the embodiment, the maximum aperture F number at the telephoto end is larger (darker) than the maximum aperture F number at the wide angle end. As a result, the shutter speed set relative to a given field brightness when the taking lens 44 is at the wide angle end is different from the shutter speed set for the same field brightness when the taking lens 44 is set at the telephoto end. Moreover, the brightness (shutter speed) at which the camera is switched from ambient light photographing to flash photographing when the taking lens 44 is at the wide angle end is different from the brightness at which the camera is switched from ambient light photographing to flash photographing when the taking lens 44 is at the telephoto end. Thus, the graph in the solid line and the graph in the one-dot chain line in FIG. 2 do not overlap each other, and instead, they are offset from each other in the vertical and horizontal directions.

When a photographing operation is performed under conditions in which the field brightness is equal to or lower than Bvc and exceeds Bvd, an almost constant image surface exposure quantity can be achieved for the main subject irradiated by the electronic flash unit 20 regardless of the field brightness, but the image surface exposure quantity for the background becomes lowered as the field brightness decreases, as has been explained earlier in reference to the example in which the taking lens 44 is set at the wide angle end. Also, as explained earlier, the ambience of the photographic scene can be reproduced in a satisfactory manner in an image obtained through a photographing operation performed with the field brightness exceeding the reference brightness Bvd. In other words, the brightness range equal to or lower than Bvc and exceeding Bvd constitutes the background depiction priority range when the taking lens 44 is set at the telephoto end.

In the brightness range with the field brightness equal to or lower than Bvd, the shutter speed is set to a shutter speed Tvd which is higher than the shutter speed Tvc set in the background depiction priority range. In this brightness range, too, the control circuit 10 causes the electronic flash unit 20 to emit light. In this brightness range, prevention of deterioration in the image quality resulting from hand-movement blurring is given priority over achieving an improvement in the depiction of the background. In other words, the brightness range with the field brightness equal to or lower than Bvd constitutes a blur-prevention priority range when the taking lens 44 is set at the telephoto end.

While an explanation is given above on examples in which the taking lens 44 is positioned at the wide angle end and the telephoto end, the present invention is not limited to those examples. Namely, when the taking lens 44 is set at an intermediate focal length, a background depiction priority brightness range and a blur prevention priority brightness range should be set in conformance to the corresponding focal length and the corresponding maximum aperture F value. If the taking lens is a single focal point lens, one background depiction priority brightness range and one blur prevention priority brightness range should be set.

In addition, while an explanation is given above on an example in which the present invention is adopted in a still camera that uses silver halide film, it may be adopted in an electronic still camera that employs a solid image-capturing element such as a CCD or a MOS image capturing element to perform photoelectric conversion on a subject image formed by the taking lens and records image data thus obtained.

Figure 3:
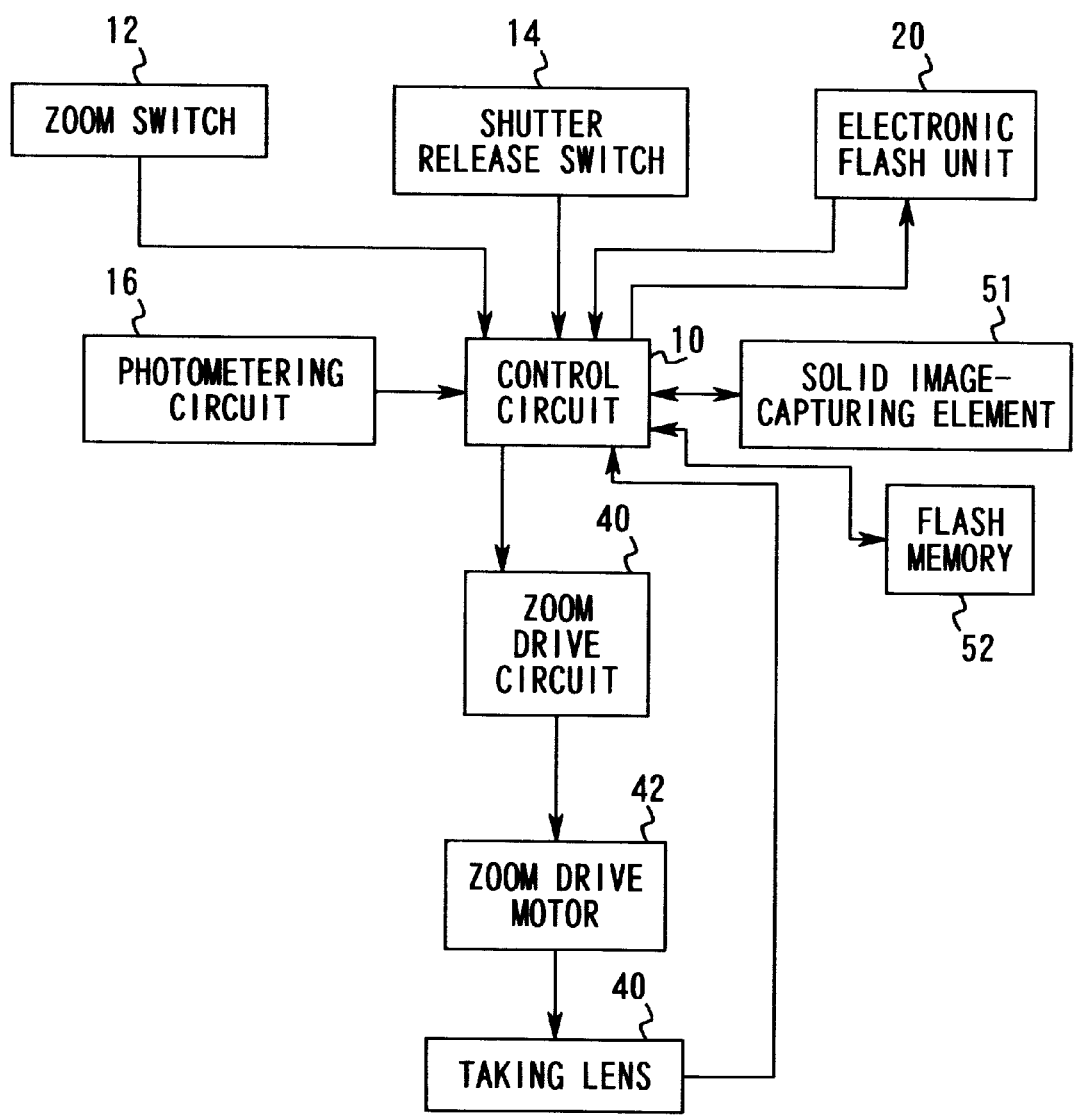
FIG. 3 schematically illustrates the internal structure of the electronic camera according to the present invention.

FIG. 3 illustrates a schematic internal structure of such an electronic still camera. It differs from the structure shown in FIG. 1 in that it is also provided with a solid image-capturing element 51 and a flash memory 52 that records image data. Since the presence of the lens shutter 30 in FIG. 1 becomes optional, it is omitted in this structure. In other words, instead of controlling the shutter speed with the lens shutter 30, the shutter speed is controlled by a so-called electronic shutter that electrically controls the length of time required for the photoelectric conversion operation performed at the light-receiving surface of the solid image-capturing element 51. The control circuit 10 controls the electronic shutter speed and also engages in image processing on image data obtained through an image-capturing operation at the solid image-capturing element 51. It is to be noted that the electronic still camera may include the lens shutter 30. Regardless of whether or not it is provided with the lens shutter 30, a higher shutter speed means a shorter period of time for photoelectric conversion (electric charge storage time). In addition, the flash memory 52 may be replaced by another type of recording medium.

When adopting the present invention in an electronic still camera, data with respect to the degree of underexposure of the background may be stored in addition to the image data obtained through photographing. In other words, by performing gradation correction based upon the data with respect to the degree of underexposure described above during the image data processing performed after photographing, depiction of the background image can be improved.

In the camera in the embodiment, the control circuit 10 implements the control described above by executing a control program installed in the ROM (not shown). This control program is normally installed in a ROM during the manufacturing process. However, the ROM in which the control program is installed may be a rewritable ROM so that by connecting the camera to a computer or the like (not shown), an upgrade program can be obtained from a recording medium such as a CD ROM via the computer. In this case, the control program executed by the control circuit 10 is recorded in a recording medium such as a CD ROM. In addition, an upgrade program can be obtained via the internet or the like in a similar manner. In such a case, the control program executed by the control circuit 10 is provided in the form of a data signal on a carrier wave transmitted on a communication line.

What is claimed is:

1. A camera comprising:
 a photographing control device that (1) performs flash photographing accompanied by light emission by an electronic flash unit with a shutter speed fixed when results of field brightness measurement performed by a photometering device which measures field brightness indicate a value equal to or lower than a predetermined first reference brightness, (2) performs flash photographing at a first shutter speed when the results of the field brightness measurement indicate a value equal to or lower than said first reference brightness and higher than a second reference brightness which is lower than said first reference brightness and (3) performs flash photographing at a second shutter speed higher than said first shutter speed when the results of the field brightness measurement indicate a value equal to or lower than said second reference brightness.

2. A camera according to claim 1, wherein:
 said first reference brightness corresponds to a field brightness at which a correct image surface exposure quantity is achieved at said first shutter speed without light emission by the electronic flash unit; and
 said second reference brightness corresponds to a brightness close to a lower limit of a field brightness range over which a background located far beyond a main subject over a distance such that flash light emitted from said electronic flash unit does not substantially reach can be depicted in an image obtained through a photographing operation performed at said first shutter speed.

3. A camera according to claim 1, wherein:
 said first shutter speed is roughly equal to a hand-held photographing limit shutter speed that is determined in correspondence to a focal length of a taking lens mounted or internally provided at a camera main body.

4. A camera according to claim 1, wherein:
 said second shutter speed which is higher than approximately twice said first shutter speed.

5. A camera comprising:
 a photographing control device that (1) performs ambient light photographing by using a combination of a shutter speed and an aperture value corresponding to results of field brightness measurement performed by a photometering device which measures field brightness when the results of the field brightness measurement indicate a value higher than a predetermined first reference brightness, (2) performs flash photographing accompanied by light emission by an electronic flash unit with a shutter speed fixed when the results of the field brightness measurement indicate a value equal to or lower than said first reference brightness, (3) performs flash photographing at a first shutter speed when the results of the field brightness measurement indicate a value equal to or lower than said first reference brightness and higher than a second reference brightness which is lower than said first reference brightness and (4) performs flash photographing at a second shutter speed higher than said first shutter speed when the results of the field brightness measurement indicate a value equal to or lower than said second reference brightness.

6. An electronic camera comprising:
 an image-capturing element that performs photoelectric conversion on a subject image formed by a photographic optical system; and
 a photographing control device that (1) performs flash photographing accompanied by light emission by an electronic flash unit with a length of photoelectric conversion time at said image-capturing element fixed when results of field brightness measurement performed by a photometering device which measures field brightness indicate a value equal to or lower than a predetermined first reference brightness, (2) performs flash photographing with a first length of photoelectric conversion time when the results of the field brightness measurement indicate a value equal to or lower than said first reference brightness and higher than a second reference brightness which is lower than said first reference brightness and (3) performs flash photographing with a second length of photoelectric conversion time shorter than said first length of photoelectric conversion time when the results of the field brightness measurement indicate a value equal to or lower than said second reference brightness.

7. An electronic camera according to claim 6, wherein:

said first reference brightness corresponds to a field brightness at which a correct image surface exposure quantity is achieved with said first length of photoelectric conversion time without light emission by said electronic flash unit; and said second reference brightness corresponds to a brightness close to a lower limit of a field brightness range over which a background located far beyond a main subject over a distance such that flash light emitted from said electronic flash unit does not substantially reach can be depicted in an image obtained through a photographing operation performed with said first length of photoelectric conversion time.

8. An electronic camera according to claim 6, wherein:

said first length of photoelectric conversion time is roughly equal to a hand-held photographing limit photoelectric conversion time that is determined in correspondence to a focal length of a taking lens mounted or internally provided at a camera main body.

9. An electronic camera according to claim 6, wherein:

said second length of photoelectric conversion time is shorter than approximately ½ of said first length of photoelectric conversion time.

* * * * *